US008928727B1

(12) United States Patent
Milligan et al.

(10) Patent No.: US 8,928,727 B1
(45) Date of Patent: Jan. 6, 2015

(54) SHARING INPUT DEVICE DATA IN A MULTIWAY VIDEO CONFERENCE PROVIDED IN AN ONLINE SOCIAL NETWORK

(75) Inventors: Timothy Seeds Milligan, Redmond, WA (US); Chee Chew, Redmond, WA (US); Daniel Caiafa, Seattle, WA (US); Hin-Chung Lam, Kirkland, WA (US); James Neil Weatherall, Kirkland, WA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/605,922

(22) Filed: Sep. 6, 2012

(51) Int. Cl.
*H04N 7/15* (2006.01)
(52) U.S. Cl.
USPC .......... 348/14.08; 348/14.07; 348/14.09; 379/202.01; 709/231; 709/235
(58) Field of Classification Search
USPC .......... 348/14.08, 14.09; 715/753, 756; 709/222, 227, 235, 231
See application file for complete search history.

(56) References Cited

U.S. PATENT DOCUMENTS

| 6,285,363 | B1 | 9/2001 | Mairs et al. | |
|---|---|---|---|---|
| 8,762,544 | B2 * | 6/2014 | King | 709/227 |
| 2008/0019522 | A1 * | 1/2008 | Proctor | 380/255 |
| 2009/0217177 | A1 * | 8/2009 | DeGrazia | 715/753 |
| 2009/0228801 | A1 * | 9/2009 | Lee et al. | 715/730 |
| 2009/0292999 | A1 * | 11/2009 | LaBine et al. | 715/740 |
| 2010/0271288 | A1 * | 10/2010 | Srinivasan et al. | 345/2.2 |
| 2011/0276715 | A1 * | 11/2011 | King | 709/235 |
| 2011/0276900 | A1 * | 11/2011 | Khan et al. | 715/753 |

OTHER PUBLICATIONS

"Cisco WebEx Meeting Center Select Feature Guide Host," Cisco Systems Inc. 2010, retrieved from <http://try.webex.com/meet/pdfs/2ds_mc-sfg-host_3.pdf>, visited Apr. 2, 2012.
"Running a WebEx as a presenter," Cisco Systems, Inc., retrieved from <http://www.oucs.ox.ac.uk/webex/Windows/runningawebexaspresenter.pdf>, visited Apr. 2, 2012.
"WebEx Key Features—Share Content," Cisco Systems Inc., retrieved from <http://www.webex.com/lp/features/share.php>, visited Apr. 2, 2012.
"WebEx Key Features—Pass the ball," Cisco Systems Inc., retrieved from <http://www.webex.com/lp/features/passtheball.php>, visited Apr. 2, 2012.
"SkyRemote User Manual," Scand Ltd, 2012, retrieved from <http://scand.com/products/skyremote/manual.html>, visited Apr. 2, 2012.
"SkyRemote—Share Your Desktop and Conrol Remote Desktop," Scand Ltd, 2012, retrieved from <http://scand.com/products/skyremote>, visited Apr. 2, 2012.
Ladnik, "Remote Desktop Control with Automated Skype," Feb. 23, 2011, retrieved from <http://www.codeproject.com/Articles/161451/Remote-Desktop-Control-with-Automated-Skype>, visited Apr. 2, 2012.

* cited by examiner

*Primary Examiner* — Joseph J Nguyen
(74) *Attorney, Agent, or Firm* — McDermott Will & Emery LLP (57) ABSTRACT

The subject technology discloses configurations for receiving input device data via an unreliable data channel from a first computing device in which the input device data includes keyboard data, mouse input data and/or touch and gesture data from the first computing device. The subject technology determines a host client computing device among one or more second computing devices in a multiway video conference for receiving the input device data. Further, the subject technology transmits the input device data via a second unreliable data channel to the determined host client computing device, where the input device data is transmitted on a separate data channel from any video or audio data transmitted to the host client computing device.

19 Claims, 5 Drawing Sheets

SHARING INPUT DEVICE DATA IN A MULTIWAY VIDEO CONFERENCE PROVIDED IN AN ONLINE SOCIAL NETWORK

BACKGROUND

Video conferencing technology enables one or more users to communicate via a video conference in which each user can transmit video and audio to another user in the video conference.

SUMMARY

The subject technology provides for sharing data. The subject technology receives input device data via an unreliable data channel from a first computing device in which the input device data includes keyboard data and mouse input data from the first computing device. The subject technology determines a host client computing device among one or more second computing devices in a multiway video conference for receiving the input device data. The subject technology transmits the input device data via a second unreliable data channel to the determined host client computing device in which the input device data is transmitted on a separate data channel from any video or audio data transmitted to the host client computing device. The subject technology receives video data via a video channel from the host client computing device in which the video data includes data of a remote user's desktop responsive to the transmitted input device data. Additionally, the subject technology transmits the video data via respective video channels to the first computing device and the one or more second computing devices in the multiway video conference in which each of the respective video channels respectively correspond to the first computing device and each of the one or more second computing devices.

The subject technology provides for sharing data. The subject technology receives input device data via an unreliable data channel from a first computing device in which the input device data includes keyboard data and mouse input data from the first computing device. A host client computing device is determined among one or more second computing devices in a multiway video conference for receiving the input device data. Further, the subject technology transmits the input device data via a second unreliable data channel to the determined host client computing device in which the input device data is transmitted on a separate data channel from any video or audio data transmitted to the host client computing device.

Yet another aspect of the subject technology provides a system for sharing data. The system includes one or more computing devices. The one or more computing devices include memory, one or more processors, and one or more modules stored in memory for executing one or more instructions by the one or more processors. The one or more instructions include instructions for receiving input device data via an unreliable data channel from a first computing device in which the input device data includes keyboard data and mouse input data from the first computing device. The instructions further include instructions for determining a host client computing device among one or more second computing devices in a multiway video conference for receiving the input device data. The instructions also include instructions for transmitting the input device data via a second unreliable data channel to the determined host client computing device in which the input device data is transmitted on a separate data channel from any video or audio data transmitted to the host client computing device. Further, the instructions include instructions for receiving video data via a video channel from the host client computing device in which the video data includes data of a remote user's desktop responsive to the transmitted input device data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

A given video conferencing system can enable one or more users on different computing devices to collaborate and communicate on a real-time basis via a video conference. The video conferencing system may be a server that routes data to each computing device, or alternatively a peer-to-peer implementation in which each computing device directly communicates with another computing device. The video conference can take place over a network (e.g., the Internet, intranet, etc.) between different computing devices of different remote users. Each computing device in one example includes video and audio capabilities (e.g., web camera, sound card, etc.) for capturing video and audio data during the video conference, which is then transmitted utilizing the video conferencing system. Further, video conference software executing on each computing device communicates with the video conference system. In this manner, the video and audio data from a first remote user's computing device can be shared with another remote user's computing device by the video conference system.

Multiway video conferences involving more than two remote users are becoming more prevalent. As used herein, the phrase "multiway video conference" includes its plain and ordinary meaning, including, but not limited to, a video conference involving more than two remote users on respective computing devices that facilitates real-time communication and collaboration between the users. In one example, a user's desktop graphical user interface (GUI) can be shared (e.g., screencast) with the other users in a multiway video conference. During the multiway video conference, the user may wish to grant control of the user's desktop graphical user interface (desktop GUI) to another user in order to troubleshoot an issue or allow the other user to manipulate/interact the desktop GUI (or application running on the user's desktop GUI) for another purpose. However, the types of interactions that can occur between the users during the multiway video conference can be limited in some instances. Typically, to grant access to the desktop GUI, the user and the other user are required to establish a remote desktop connection wholly separate from the video conference (e.g., by utilizing specialized software rather an integrated capability of the video conferencing system), which may interrupt the conversation flow and adversely affect the user experience. Further, some existing solutions for providing remote desktop sharing may introduce additional latency into the video conferencing system and, as a result, degrade the user experience (e.g., by dropping video and/or audio data, delaying the presentation of video and/or audio, or utilizing substantial amounts of computing resources, etc.).

Online social networks are popular services for enabling users to interact, share data and communicate with other users. Providers of online social networks may wish to extend the capabilities and functionality included in such online social networks to further enrich the user experience and provide other avenues for interacting with users. In this regard, few existing online social networks fully leverage video conferencing capabilities with respect to providing multiway video conferencing between different users of the online social network. In particular, multiway video conferencing provided by a given online social network may lack the capability to seamlessly provide desktop GUI sharing (e.g., screencasting) and for remotely controlling the desktop GUI (or application running on the desktop GUI) on a remote user's computing device (e.g., by another user in a multiway video conference).

As described herein, the phrase "client computing device" includes its plain and ordinary meaning, including, but not limited to, a computing device that remotely controls another computing device. Further, as described herein, the phrase "host client computing device" includes its plain and ordinary meaning, including, but not limited to, a computing device that is remotely controlled by another computing device. Additionally, as described herein, the phrase "remoting session" includes its plain and ordinary meaning, including, but not limited to, a session established between a client computing device and a host client computing device for remotely controlling the host client computing device.

The subject technology described herein provides a system, performed on one or more computing devices, for sharing data in a multiway video conference between a first computing device and one or more second computing devices in an online social network. The multiway video conference provided by the online social network can be accessed by a web browser on each of the respective computing devices. In one example, the system is implemented as a server that communicates with each of the computing devices via an existing network infrastructure (e.g., Internet, intranet, etc.). Each of the computing devices can correspond with a respective user in the online social network. The server acts as a hub for receiving video and audio data from one computing device and then broadcasting the video and audio data to the other computing devices in the multiway video conference. For instance, incoming video and audio data can include data corresponding to the video and audio captured at the respective computing devices of respective users, which is then broadcast to the other user's computing devices for presentation and processing.

Figure 1:
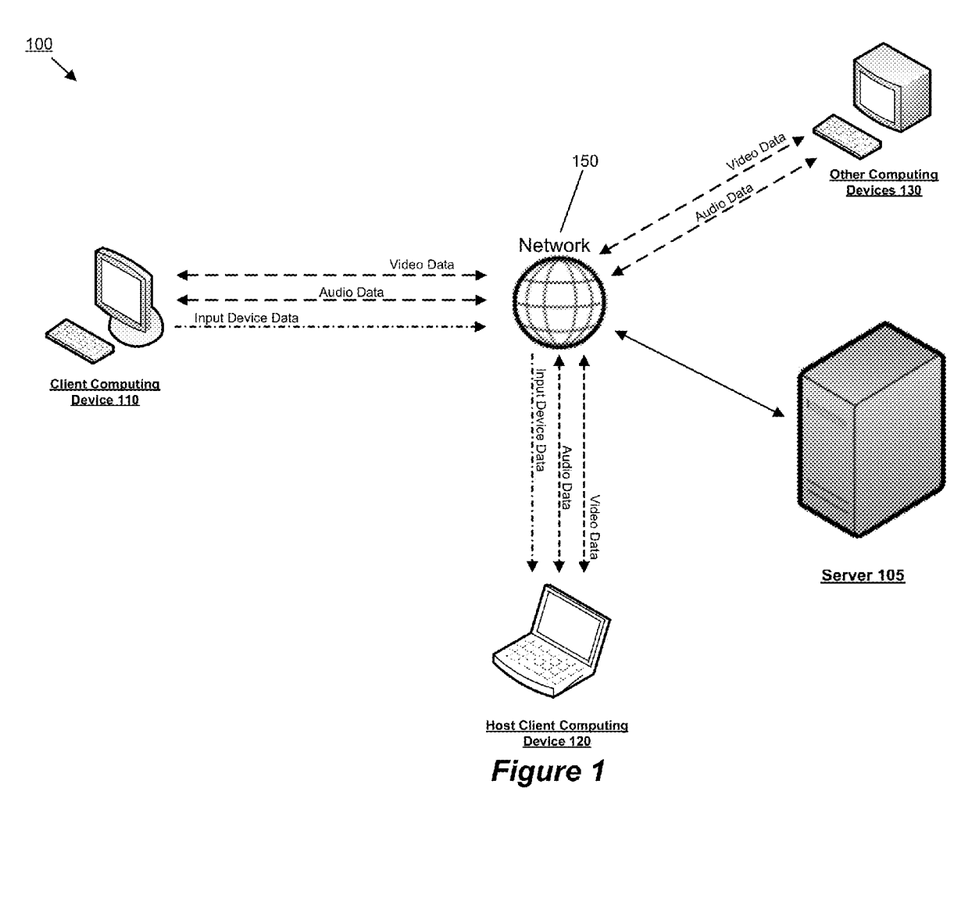
FIG. 1 illustrates a system for sharing data in a multiway video conference between a client computing device, a host client computing device and one or more other computing devices.

FIG. 1 illustrates a system 100 for sharing data in a multiway video conference between a client computing device, a host client computing device and one or more other computing devices. More specifically, the system 100 includes a client computing device 110, a host client computing device 120 and one or more other computing devices 130. The system 100 further includes a server 105 configured for sharing data to each of the computing devices in the system 100 in an online social network.

Although the example shown in FIG. 1 includes a single server 105, the system 100 can include a respective cluster of servers/computers that perform a same set of functions provided by the server 105 in a distributed and/or load balanced manner. A cluster can be understood as a group of servers/computers that are linked together to seamlessly perform the same set of functions, which can provide performance, reliability and availability advantages over a single server/computer architecture.

As illustrated in FIG. 1, the server 105 in one example utilizes different (and separate) data channels for communicating with each of the computing devices. For instance, incoming video and audio data are received on respective video and audio channels over a network from respective computing devices and then broadcasted to the other computing devices via respective video and audio channels corresponding to the other computing devices. The different data channels can be logical channels, physical channels and/or a mixture of logical and physical channels in some configurations.

Video, audio, and input device data can be transmitted via a network 150, which can include, but is not limited to, a local network, remote network, or an interconnected network of networks (e.g., Internet). Moreover, the client computing device 110, host client computing device 120, other computing devices 130 and server 105 can be configured to communicate over any type of network, such as a local area network, a wide area network, or an interconnected network of networks (e.g., the Internet) and by using any sort of network/communications protocol (Transmission Control Protocol and Internet Protocol (TCP/IP), HTTP, etc.).

The server 105 can establish a remoting session between the client computing device 110 and the host client computing device 120 based on an interaction between the client computing device 110 and host client computing device 120 in the online social network. More specifically, the server 105 facilitates a negotiation between the client and host client computing devices (e.g., by accepting the request from the client and then routing it to the host). As the respective users on the client and host client computing devices have been authenticated via the online social network, the server 105 is not required re-authenticate the client computing device 110 and host client computing device 120. In one example, the client computing device 110 can transmit a request, via the online social network, intended for the host client computing device 120 for accessing a desktop or a specific application window on the host client computing device's desktop. The server 105 can receive the request and then subsequently route the request to the host client computing device 120. On the host client computing device 120, the request can be presented as a dialog box, notification, or message within the online social network. If a user on the host client computing device 110 accepts the request to grant access to the client computing device 110, the remoting session is automatically established between client and host client computing devices. For instance, the server 105 can receive an acknowledgment that the host client computing device 120 granted access to the client computing device. In this manner, a typical setup for remote access that requires a multiplicity of steps is reduced to fewer (and more friendly to the user experience) steps.

To provide remote access and control of one user's computing device in the multiway video conference, the server 105 utilizes a separate data channel for receiving control data (e.g., input device data) from the client computing device 110 and another separate data channel transmitting the control data to the host client computing device 120. The control data in some configurations includes input device data such as mouse input data, keyboard data and/or touch and gesture data. The mouse input data corresponds to mouse events that are captured by the client computing device and then transmitted to the server 105. Similarly, the keyboard data corresponds to keyboard events that are captured by the client computing device and subsequently transmitted to the server 105. Touch and gesture data correspond to inputs received via a touch sensitive input device such as a touch screen or touch pad, etc. In one example, the separate data channel is an unreliable data channel that utilizes a reliable communication protocol for transferring data to the host client computing device. An unreliable data channel, in one example, can transport packets according to the following transport protocols: User Datagram Protocol (UDP), Real Time Streaming Protocol (RTSP), Stream Control Transmission Protocol (SCTP), Datagram Congestion Control Protocol (DCCP), etc. The unreliable data channel exhibits an amount of data loss in some instances.

Figure 2:
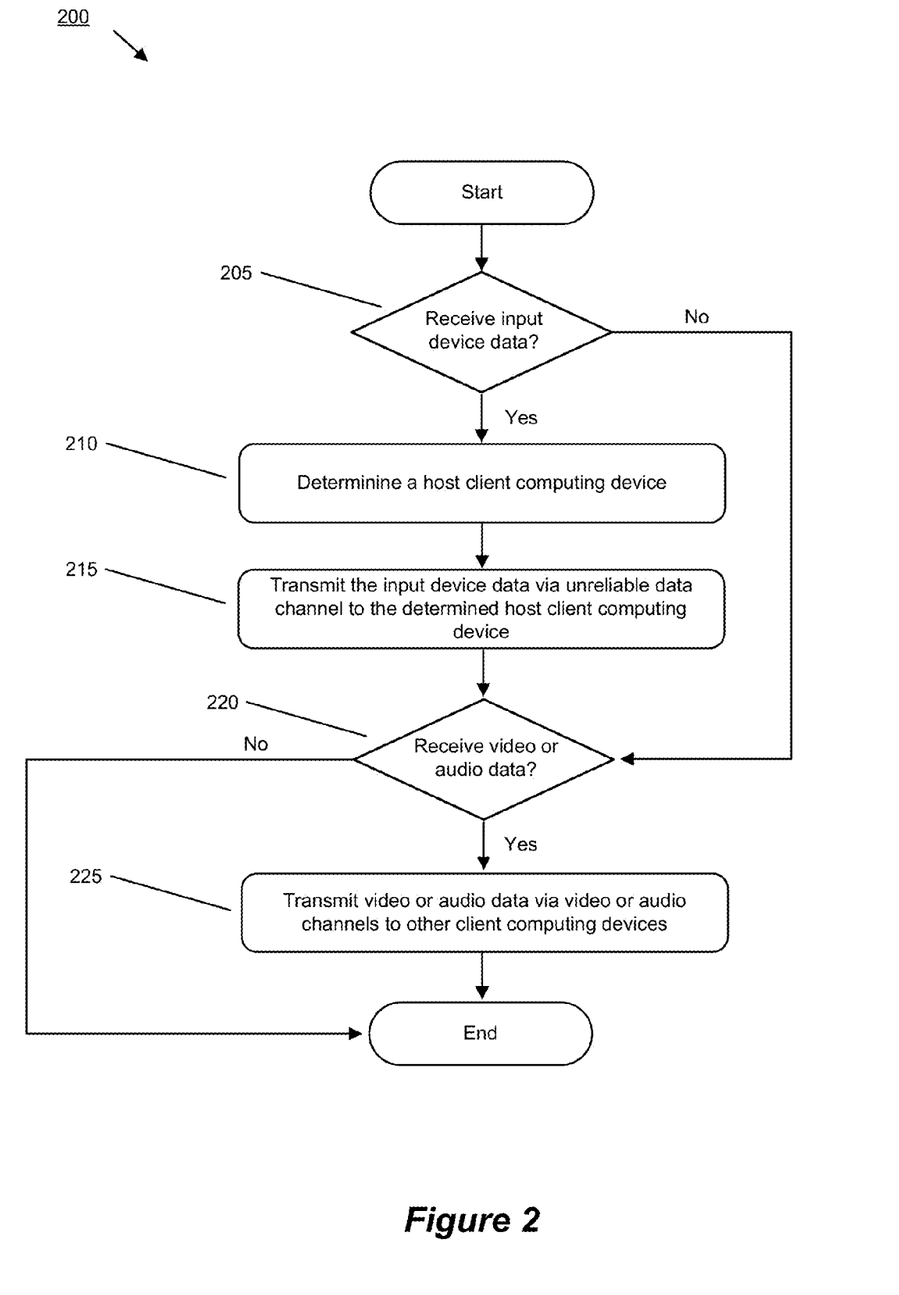
FIG. 2 illustrates an example process for sharing data to one or more client computing devices.

FIG. 2 illustrates an example process 200 for sharing data to one or more client computing devices. In particular, the process 200 is performed by one or more computing devices, such as the server 105 illustrated in FIG. 1, in order to share data to one or more client computing devices in a multiway video conference provided by an online social network.

The process 200 begins at 205 by receiving input device data via an unreliable data channel from a first computing device (e.g., the client computing device) in which the input device data includes keyboard data and mouse input data from the first computing device. In some configurations, the input device data includes touch and gesture data from the first computing device. If so, the process 200 continues to 210 as described below. Alternatively, the process 200 continues to 220 as described further below.

The process 200 at 210 determines a host client computing device among one or more second computing devices in a multiway video conference for receiving the input device data. This determination can be made, by way of example, by including a unique identifier (e.g., IP destination address) or token with the received input device data that corresponds to the host client computing device. The host client computing device accepts the input device data for being remotely controlled by the first computing device based on an interaction between the host and first computing devices in the online social network (e.g., via the aforementioned negotiation procedure described above). Each of the first computing device and the one or more second computing devices correspond to respective users in an online social network in one example.

The process 200 at 215 then transmits the input device data via a second unreliable data channel to the determined host client computing device in which the input device data is transmitted on a separate data channel from any video or audio data transmitted to the host client computing device. The input device data transmitted via the second unreliable data channel utilizes a reliable communication protocol. However, the second unreliable data channel exhibits an amount of data loss. Because of the potential data loss, the input device data is transmitted in replicate via the second unreliable data channel in some instances. Further, transmitting the input device data occurs over a unicast connection established with the host client computing device in some configurations. The unicast connection provides an additional security benefit as the input device data is only transmitted to an intended destination (e.g., the determined host client computing device) to minimize the potential for network snooping.

After transmitting the input device data at 215, the process 200 determines at 220 if video and/or audio data from one of the computing devices in the multiway video conference is received. For the sake of simplicity and not to obscure the below description, the following example illustrates receiving video and audio data from one computing device. However, it should be understood that video and audio data can be received from each of the computing devices (at various different times). In this example, the process 200 receives video data via a video channel and audio data via an audio channel from the first computing device in which the video and audio channels are separate data channels from the aforementioned unreliable data channel.

To broadcast this data to the other computing devices in the multiway video conference, the process 200 at 225 transmits the video data via respective video channels to the host client computing device and the one or more second computing devices. Each of the respective video channels respectively corresponds to each of the host client computing device and the one or more second computing devices. Similarly, the process 200 transmits the audio data via respective audio channels to the host client computing device and the one or more second computing devices in the multiway video conference. Each of the respective audio channels respectively corresponds to each of the host client computing device and the one or more second computing devices. The video and audio data can be transmitted asynchronously in one example. Alternatively, the video and audio data can be transmitted synchronously in a parallel manner.

In another example, the process 200 receives video data from the host client computing device at 220. For instance, the video data includes data of a remote user's desktop at the host client computing device responsive to the transmitted input device data from 215. In particular, the video data includes data of an entirety of the remote user's desktop or includes data of a specific application window from the remote user's desktop in some configuration. To broadcast this video data to the other computing devices, the process 200 transmits the video data at 225 via respective video channels to the first computing device and the one or more second computing devices in the multiway video conference. Each of the respective video channels respectively corresponds to the first computing device and each of the one or more second computing devices. In this manner, the host client computing device's desktop GUI can be shared with the other computing devices. The process 200 then ends.

A client computing device can capture input device data (e.g., mouse, keyboard and/or touch and gesture input) for remotely controlling a host client computing device and then transmit the input device data to a server. As described above, the server can receive the input device data and then subsequently transmit the input device data to a host client computing device. Given that the input device data is transmitted via an unreliable data channel in order to reduce latency in the multiway video conference, some percentage of data loss is tolerated. To address potential data loss, the server transmits the input device data in replicate in some configurations. In other words, the server transmits duplicated input device data to the host client computing device. At the host client computing device, input device data (including duplicated input device data) is processed.

Figure 3:
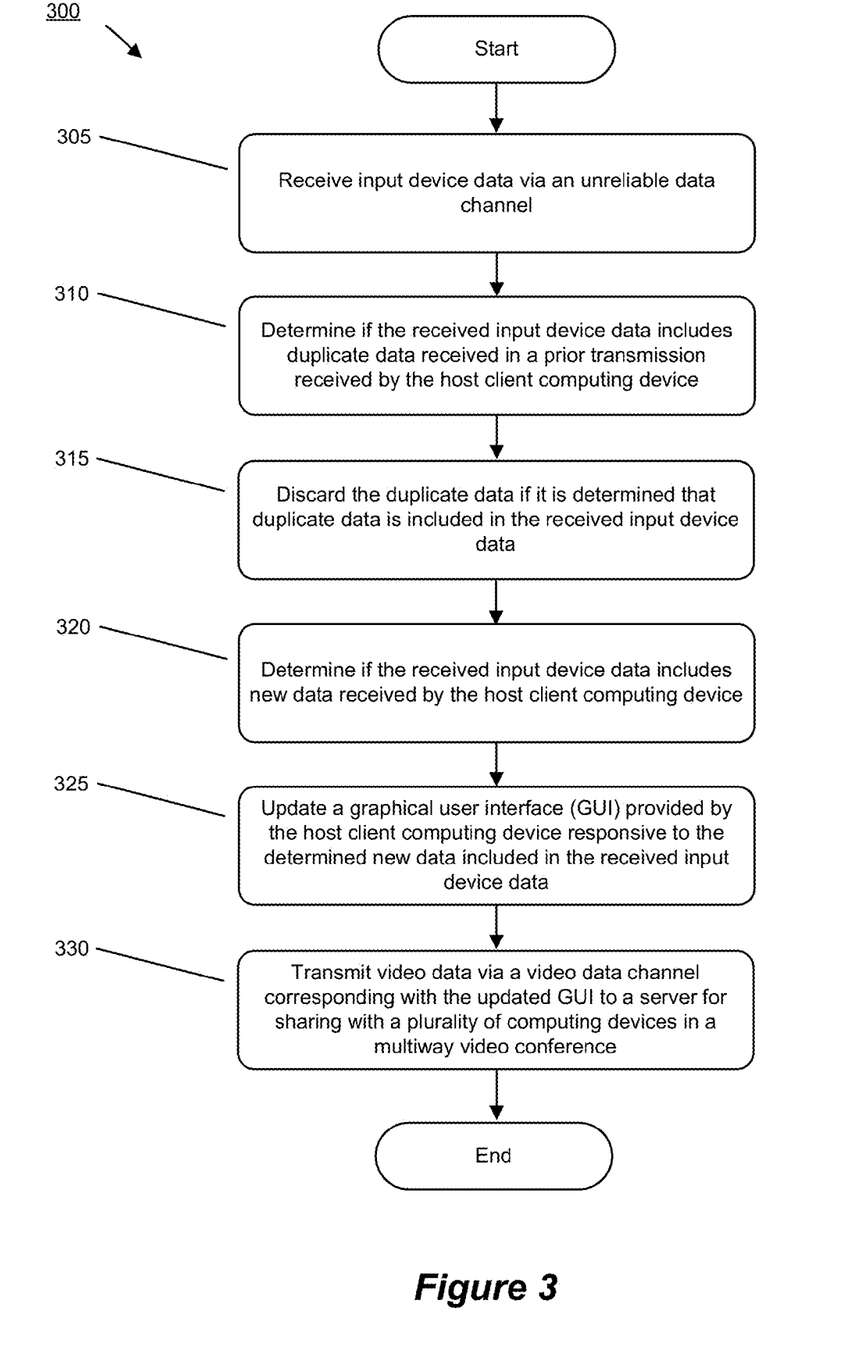
FIG. 3 illustrates an example process for remotely controlling a computing device.

FIG. 3 illustrates an example process 300 for remotely controlling a computing device. In particular, after the input device data is transmitted from the server, the subject technology provides the process 300 performed by a host client computing device for processing input device data received at the host client computing device from the server.

The process 300 begins at 305 by receiving input device data via an unreliable data channel in which the input device data includes keyboard data and mouse input data for remotely controlling the host client computing device by a client computing device. Further, in some configurations, the input device data includes touch and gesture data.

The process 300 at 310 determines if the received input device data includes duplicate data received in a prior transmission received by the host client computing device. In one example, the received input device data includes one or more data segments including keyboard data, mouse input data, or touch and gesture data, where each of the one or more data segments include respective identifiers for each keyboard data, mouse input data, or touch and gesture data included in the one or more data segments. To determine if the received input device data includes duplicate data, the process 300 determines if the one or more data segments have been previously received based on the respective identifiers for each keyboard data, mouse input data, or touch and gesture data included in the one or more data segments. For instance, the respective identifiers indicate a sequence in which the each keyboard data, mouse input data, or touch and gesture data was received. The process 300 utilizes a record of previously received data segments according to the respective identifiers, and then compares the respective identifiers in the received data segments to one or more identifiers corresponding to previously received data segments for keyboard, mouse input and/or touch and gesture data.

The process 300 at 315 discards the duplicate data if it is determined that duplicate data is included in the received input device data. In one example, the process 300 flushes a buffer containing the received input device data, or marks the received input device data as invalid.

The process 300 at 320 determines if the received input device data includes new data received by the host client computing device in which the new data includes input device data that is received at an initial time by the host client computing device. In one example, the process 300 compares the respective identifiers of keyboard data, mouse input device data and/or touch and gesture data from the received input device data with the identifiers from the record of previously received keyboard, mouse and/or touch and gesture input (similar to the discussion above at 310) in order to determine if new data is received.

The process 300 at 325 updates a graphical user interface (GUI) provided by the host client computing device responsive to the determined new data included in the received input device data. For example, the GUI is refreshed or rendered according to the received input device data.

The process 300 then at 330 transmits video data via a video data channel corresponding with the updated GUI to a server for sharing with a plurality of client computing devices in a multiway video conference. The multiway video conference between the plurality of computing devices is accessed in a web browser at each of the plurality of computing devices in some configurations. The process 300 then ends.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

The following description describes an example API architecture in which some configurations of the subject technology can be implemented.

Figure 4:
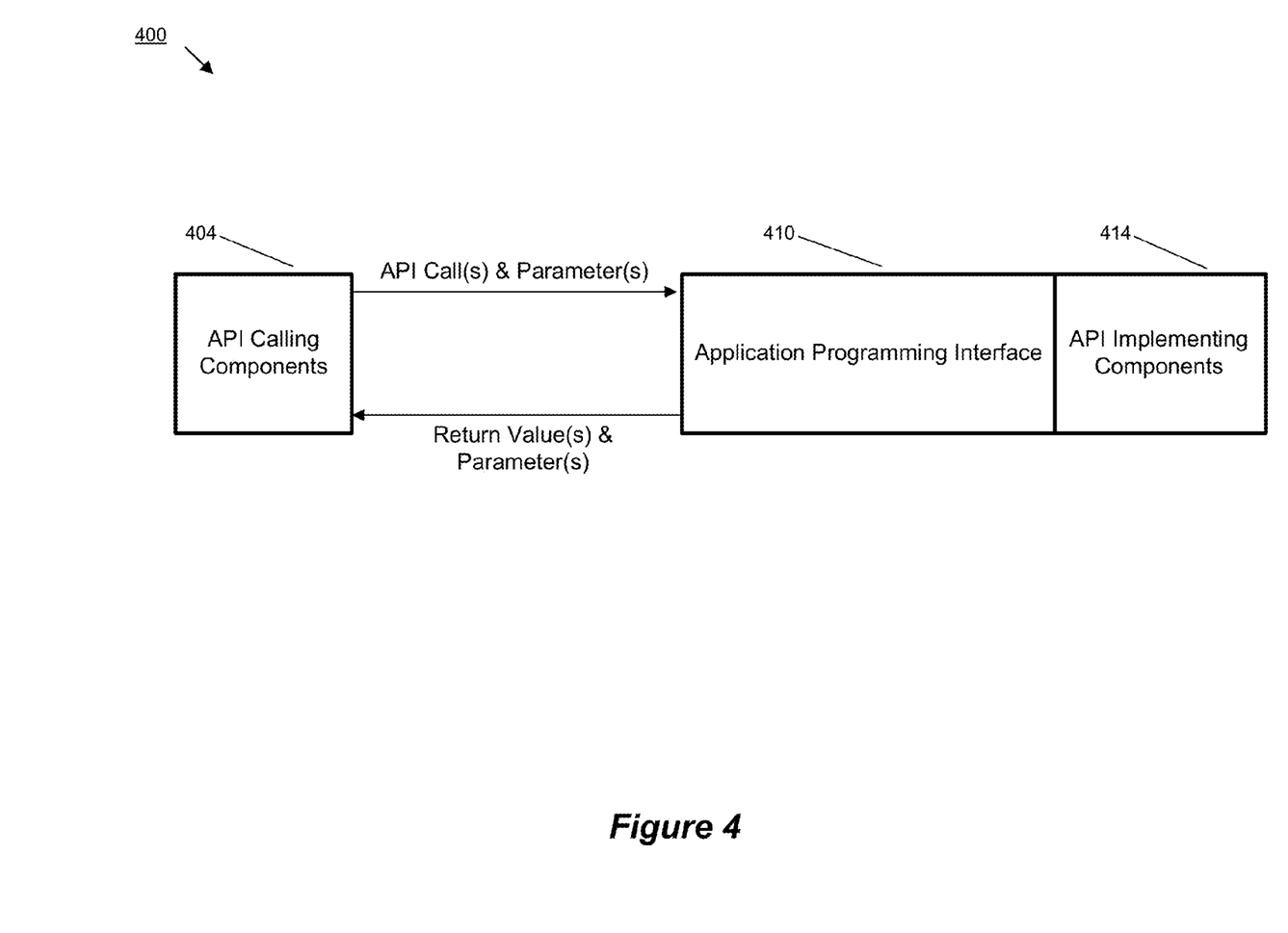
FIG. 4 conceptually illustrates an example application programming interface (API) architecture.

FIG. 4 is a block diagram illustrating an example API architecture, which can be used in some configurations of the subject technology. As shown in FIG. 4, the API architecture 400 includes the API implementing component 415 (e.g., an operating system, a library, a device driver, an API, an application program, software or other module) that implements the API 410. The API 410 specifies one or more functions, methods, classes, objects, protocols, data structures, formats and/or other features of the API-implementing component that can be used by the API-calling component 405. The API 410 can specify at least one calling convention that specifies how a function in the API implementing component receives parameters from the API calling component and how the function returns a result to the API calling component. The API calling component 405 (e.g., an operating system, a library, a device driver, an API, an application program, software or other module), makes API calls through the API 410 to access and use the features of the API implementing component 415 that are specified by the API 410. The API implementing component 415 can return a value through the API 410 to the API calling component 405 in response to an API call.

It will be appreciated that the API implementing component 415 can include additional functions, methods, classes, data structures, and/or other features that are not specified through the API 410 and are not available to the API calling component 405. It should be understood that the API calling component 405 can be on the same system as the API implementing component 415 or can be located remotely and accesses the API implementing component 415 using the API 410 over a network. While FIG. 4 illustrates a single API calling component 405 interacting with the API 410, it should be understood that other API calling components, which can be written in different languages (or the same language) than the API calling component 405, can use the API 410.

The API implementing component 415, the API 410, and the API calling component 405 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 5:
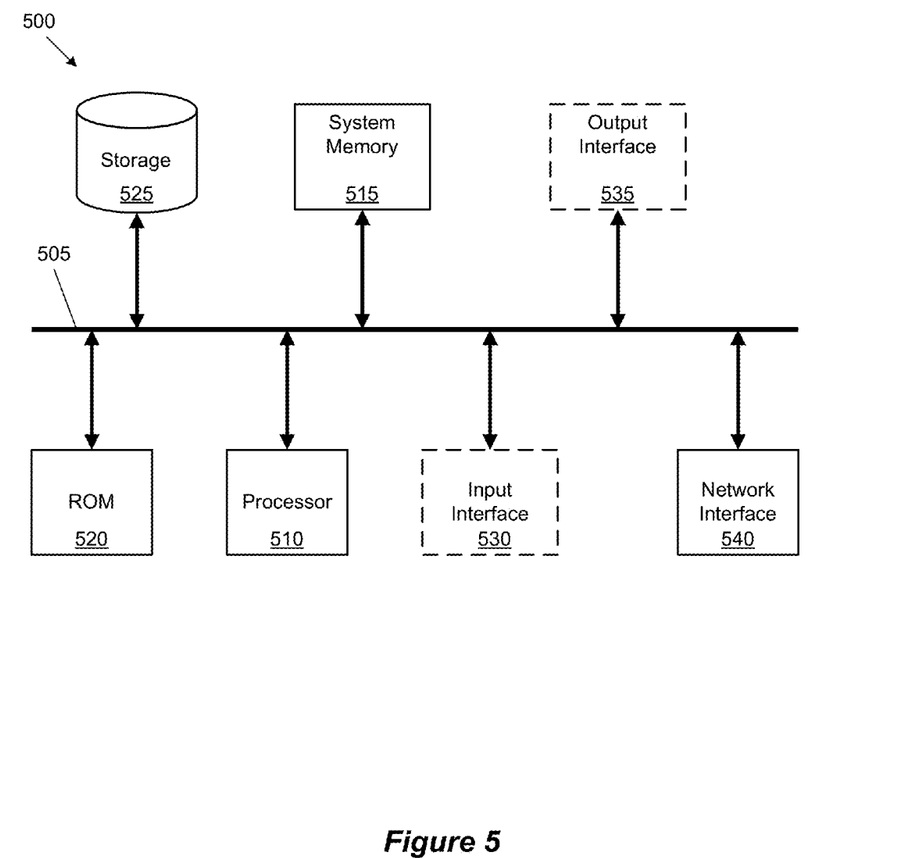
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or any other sort of electronic device. In some configurations, the system 500 includes a television with one or more processors embedded therein. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. Any or all components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method for sharing data, the method comprising:
receiving, using one or more computing devices, input device data via an unreliable data channel from a first computing device, wherein the input device data includes keyboard data and mouse input data from the first computing device;
determining, using the one or more computing devices, a host client computing device among one or more second computing devices in a multiway video conference for receiving the input device data;
transmitting, using the one or more computing devices, the input device data via a second unreliable data channel to the determined host client computing device, wherein the input device data is transmitted on a separate data channel from any video or audio data transmitted to the host client computing device;
receiving video data via a video channel from the host client computing device, wherein the video data includes data of a remote user's desktop responsive to the transmitted input device data; and
transmitting, using the one or more computing devices, the video data via respective video channels to the first computing device and the one or more second computing devices in the multiway video conference, wherein each of the respective video channels respectively correspond to the first computing device and each of the one or more second computing devices,
wherein each of the unreliable data channel and the second unreliable data channel exhibits a respective amount of data loss.

2. A machine-implemented method for sharing data, the method comprising:
receiving, using one or more computing devices, input device data via an unreliable data channel from a first computing device, wherein the input device data includes keyboard data and mouse input data from the first computing device;
determining, using the one or more computing devices, a host client computing device among one or more second computing devices in a multiway video conference for receiving the input device data; and
transmitting, using the one or more computing devices, the input device data via a second unreliable data channel to the determined host client computing device, wherein the input device data is transmitted on a separate data channel from any video or audio data transmitted to the host client computing device,
wherein each of the unreliable data channel and the second unreliable data channel exhibits a respective amount of data loss.

3. The method of claim 2, wherein the host client computing device accepts the input device data for being remotely controlled by the first computing device based on an interaction between the host and first computing devices in an online social network.

4. The method of claim 2, wherein the second unreliable data channel utilizes an reliable communication protocol for transferring data to the host client computing device.

5. The method of claim 2, wherein transmitting the input device data occurs over a unicast connection established with the host client computing device.

6. The method of claim 2, wherein the input device data is transmitted in replicate via the second unreliable data channel.

7. The method of claim 2, wherein each of the first computing device and the one or more second computing devices correspond to respective users in an online social network.

8. The method of claim 2, further comprising:
receiving, using the one or more computing devices, video data via a video channel and audio data via an audio channel from the first computing device, wherein the video and audio channels are separate data channels from the unreliable data channel.

9. The method of claim 8, further comprising:
transmitting, using the one or more computing devices, the video data via respective video channels to the host client computing device and the one or more second computing devices in the multiway video conference, wherein each of the respective video channels respectively corresponds to each of the host client computing device and the one or more second computing devices; and
transmitting, using the one or more computing devices, the audio data via respective audio channels to the host client computing device and the one or more second computing devices in the multiway video conference, wherein each of the respective audio channels respectively corresponds to each of the host client computing device and the one or more second computing devices.

10. The method of claim 2, further comprising:
receiving, using the one or more computing devices, video data via a video channel from the host client computing device, wherein the video data includes data of a remote user's desktop responsive to the transmitted input device data.

11. The method of claim 10, wherein the video data includes data of an entirety of the remote user's desktop.

12. The method of claim 10, wherein the video data includes data of a specific application window from the remote user's desktop.

13. The method of claim 10, further comprising:
transmitting, using the one or more computing devices, the video data via respective video channels to the first computing device and the one or more second computing devices in the multiway video conference, wherein each of the respective video channels respectively correspond to the first computing device and each of the one or more second computing devices.

14. The method of claim 2, wherein the input device data further includes touch and gesture data from the first computing device.

15. A system for sharing data, the system including one or more computing devices, the one or more computing devices comprising:
memory;
one or more processors;
one or more modules stored in memory and configured for executing one or more instructions by the one or more processors, the one or more instructions comprising:
receiving input device data via an unreliable data channel from a first computing device, wherein the input device data includes keyboard data and mouse input data from the first computing device;
determining a host client computing device among one or more second computing devices in a multiway video conference for receiving the input device data;
transmitting the input device data via a second unreliable data channel to the determined host client computing device, wherein the input device data is transmitted on a separate data channel from any video or audio data transmitted to the host client computing device; and receiving video data via a video channel from the host client computing device, wherein the video data includes data of a remote user's desktop responsive to the transmitted input device data, wherein each of the unreliable data channel and the second unreliable data channel exhibits a respective amount of data loss.

16. The system of claim 15, wherein the one or more instructions further comprise:

receiving, using the one or more computing devices, video data via a video channel and audio data via an audio channel from the first computing device, wherein the video and audio channels are separate data channels from the unreliable data channel.

17. The system of claim 16, wherein the one or more instructions further comprise:

transmitting, using the one or more computing devices, the video data via respective video channels to the host client computing device and the one or more second computing devices in the multiway video conference, wherein each of the respective video channels respectively corresponds to each of the host client computing device and the one or more second computing devices; and transmitting, using the one or more computing devices, the audio data via respective audio channels to the host client computing device and the one or more second computing devices in the multiway video conference, wherein each of the respective audio channels respectively corresponds to each of the host client computing device and the one or more second computing devices.

18. The system of claim 15, wherein the one or more instructions further comprise:

transmitting, using the one or more computing devices, the video data via respective video channels to the first computing device and the one or more second computing devices in the multiway video conference, wherein each of the respective video channels respectively correspond to the first computing device and each of the one or more second computing devices.

19. The system of claim 15, wherein the input device data further includes touch and gesture data.

* * * * *